Dec. 19, 1939.  D. S. FAHRNEY  2,183,555
AIRCRAFT
Filed Sept. 18, 1937  3 Sheets-Sheet 1

INVENTOR
DELMAR S. FAHRNEY
BY
Ransom K. Davis
ATTORNEY

Dec. 19, 1939.  D. S. FAHRNEY  2,183,555
AIRCRAFT
Filed Sept. 18, 1937   3 Sheets-Sheet 2

INVENTOR
DELMAR S. FAHRNEY
BY
ATTORNEY

Dec. 19, 1939.  D. S. FAHRNEY  2,183,555
AIRCRAFT
Filed Sept. 18, 1937  3 Sheets-Sheet 3

INVENTOR
DELMAR S. FAHRNEY
BY
ATTORNEY

Patented Dec. 19, 1939

2,183,555

UNITED STATES PATENT OFFICE 2,183,555

AIRCRAFT

Delmer S. Fahrney, United States Navy

Application September 18, 1937, Serial No. 164,489

5 Claims. (Cl. 244—19)

(Granted under the act of March 3, 1883, as amended April 30, 1928; 370 O. G. 757)

My invention relates to aircraft and more particularly to aircraft of the heavier-than-air type wherein sustentation is achieved by employing an autorotative wing structure operating on the principle of the Magnus effect.

In carrying the invention into effect use is made of a wing structure comprised of two or more airfoils, portions of which lie substantially along a cylindrical surface to thereby produce lift in accordance with the Magnus effect. The sequential arrangement of the leading and trailing edges of the airfoils is such as to insure their autorotation attending the movement of the craft through the air.

Thus, my invention has for its principal object the provision in an aircraft of an autorotative cylindrical wing structure for producing lift.

Other objects and many of the attendant advantages of this invention will be readily appreciated as the same becomes better understood by reference to the following detailed description when considered in connection with the accompanying sheets of drawings wherein.

Figures 1, 2:
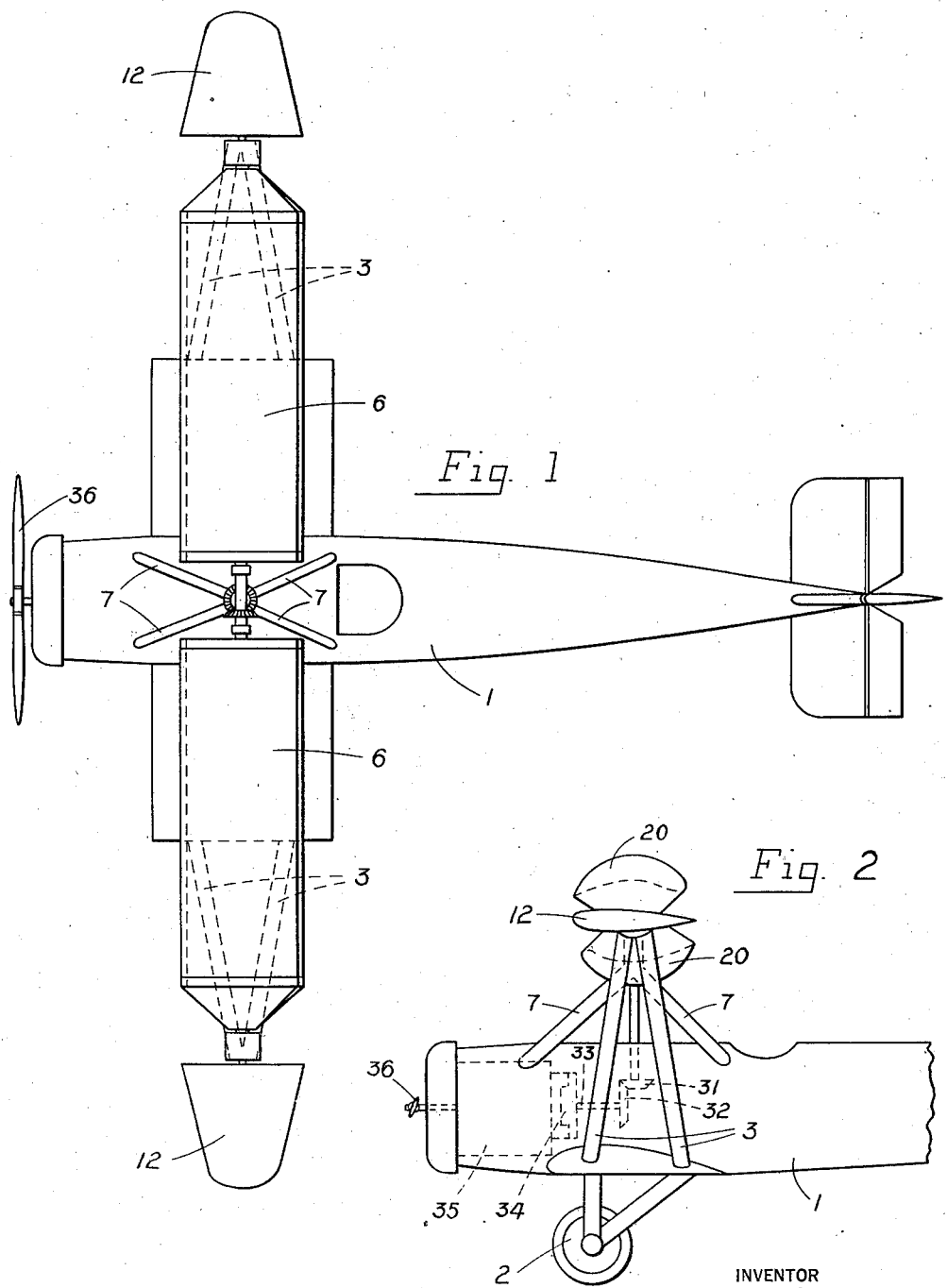
Figs. 1 and 2 are respectively views in plan and side elevation of one embodiment of my invention.

My invention is based upon the discovery of the German physicist Magnus who ascertained that a special force is exerted upon a revolving cylinder by an air current when impinging thereon substantially normal to its axis. The force so exerted is generally at right angles to the wind direction, but may diverge somewhat therefrom depending on the ratio of the speed of the wind current to the circumferential speed of the cylinder. The underlying cause of this phenomenon may be traced to the fact that when a rotating cylinder is impinged upon by an air current, the streamlines are directed so that at one side the air is rarefied by the frictional effect of the cylinder and at the other side it is compressed. This simultaneous production of a compression and a rarefaction causes a force in a direction transverse to the wind direction as previously described.

In approximating a cylindrical surface in accordance with my invention two or more airfoils of any efficient type are employed in forming the wing structure. The leading and trailing edges respectively of any two airfoils are juxtaposed to thereby make use of the increased drag of the trailing edge of one airfoil over that of the leading edge of an adjacent airfoil and thus insure the autorotation of the wing structure attending the movement of the craft through the air. While in the embodiment now to be described in detail two autorotative cylindrical wing structures are employed, the invention is not to be understood as being restricted to this number. If desired, one wing structure or any number in excess of two may be advantageously employed and arranged in any convenient manner.

Turning now to the drawings, there is shown depicted in Figs. 1 through 4 thereof a fuselage 1 to the lower portion of which there is secured in any convenient manner a suitable landing gear 2. Struts 3 extend from each side of the fuselage in the manner shown and terminate in a housing 4 as depicted more clearly in Fig. 4 of the drawings. In this housing there is securely mounted a bearing 5 for rotatively supporting the outer ends of the wing structures 6. This bearing in addition to providing lateral support also takes any end thrust. For rotatably supporting the inner ends of the wing structures 6 four supporting members 7 are suitably secured to the fuselage and merge in an upright portion 8 as shown more particularly in Fig. 3 of the drawings. Two arms 9 extend from this upright portion in a fork-like manner and terminate in bearings 10 for rotatably supporting the wing structures 6 at their inner ends.

Figure 4:
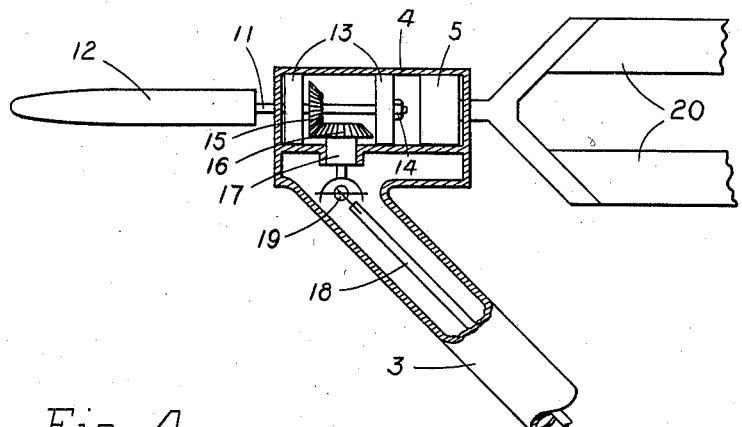
Fig. 4 is likewise a fragmentary view in front elevation on an enlarged scale of the craft but showing in partial section the manner in which the outer end of each cylindrical wing structure may be supported as well as one possible arrangement for controlling the ailerons.

The manner of mounting each of the ailerons is clearly depicted in Fig. 4 of the drawings. A shaft 11 extends from the aileron 12 into the housing 4 and is there rotatably supported by bearings 13 secured therein. A nut 14 or any other convenient means serves to hold the shaft 11 in contact with its bearing surfaces at all times. For rotating the shaft 11 to thereby control the position of the aileron there are provided bevel gears 15 and 16, the former of which is splined or otherwise rigidly secured to the shaft 11 and the latter of which is rotatably mounted in the bearing 17. A rod 18 extends lengthwise and interiorly of one of the struts 3 and is secured at its outer end to the bevel gear 16 by means of the universal joint 19. The rods 18 connected to the ailerons in the manner depicted in Fig. 4 of the drawings are operatively associated with the control stick in any convenient manner and are adapted to be actuated thereby in the conventional fashion. Thus, it is evident that any rotary movement imparted to the rod 18 will cause a corresponding rotation of the aileron 12.

Figure 5:
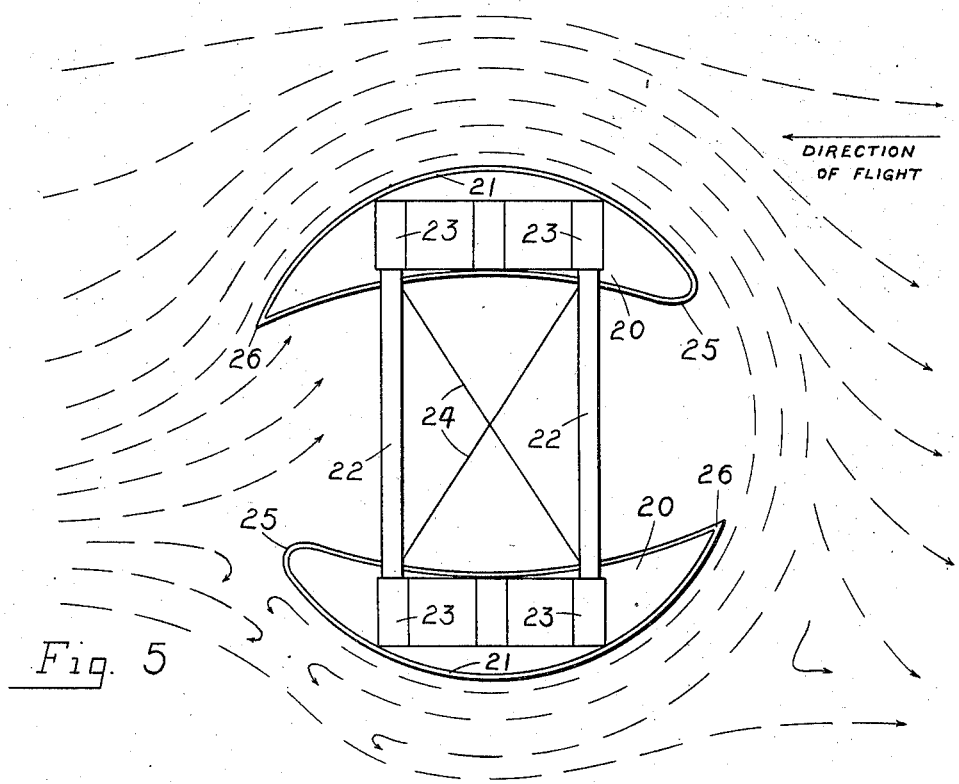
Fig. 5 is a sectional view of the wing structure employed in the craft of Fig. 1.

The precise character of the wing structure is clearly shown in Fig. 5 of the drawings to which reference is now made. It will be observed that in this particular embodiment of the invention the wing structure is comprised of two airfoils 20, the outer portions 21 of which are arranged to lie substantially along a cylindrical surface. These airfoils may be of any efficient type. Struts 22 are secured in any convenient manner to the conventional spars 23 of the several foils at suitable intervals and the truss so formed is strengthened by wire tension members or stays 24 in the manner known to the prior art. The leading edge 25 of each airfoil is juxtaposed to the trailing edge 26 of the airfoil adjacent thereto. The cylindrical wing structure is thereby rendered auto-rotative attending the movement of the craft through the air by virtue of the increased drag of the trailing edge of one airfoil over that of the entering edge of an adjacent airfoil. The airflow and direction of flight have been diagrammatically indicated in Fig. 5 and from this it is clear that the combined system of airfoils rotating as a cylinder will develop a strong lift in accordance with the Magnus effect.

Figure 7:
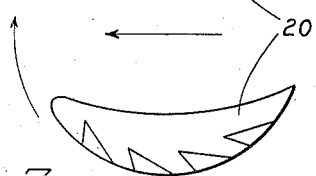

The speed of rotation of the cylindrical wing structure can, if desired, be controlled by suitably altering the periphery of the several airfoils. Thus, as shown in Fig. 7, the airfoils may be provided with slots or serrations, and as such will materially aid in propelling the cylindrical wing structure due to the impulse turbine effect of the airstream on these pockets. Instead of using any convenient form of serration the foils may alternatively be provided with projecting vanes or flaps for increasing the speed of rotation.

Figure 6:
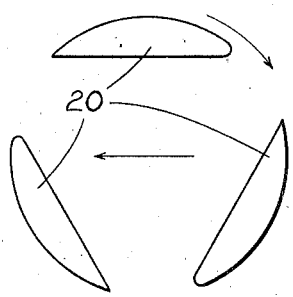
Figs. 6, 7 and 8 show respectively various forms that the wing structure may assume.
Figure 8:
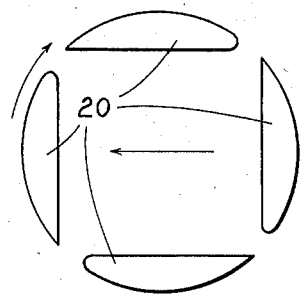

The number of airfoils employed may be two or more as shown in Figs. 5, 6 and 8 of the drawings. It is conceivable that the number of airfoils may be increased until the section becomes in fact a cylinder with longitudinal serrations representing the trailing edges of the airfoils.

Figure 3:
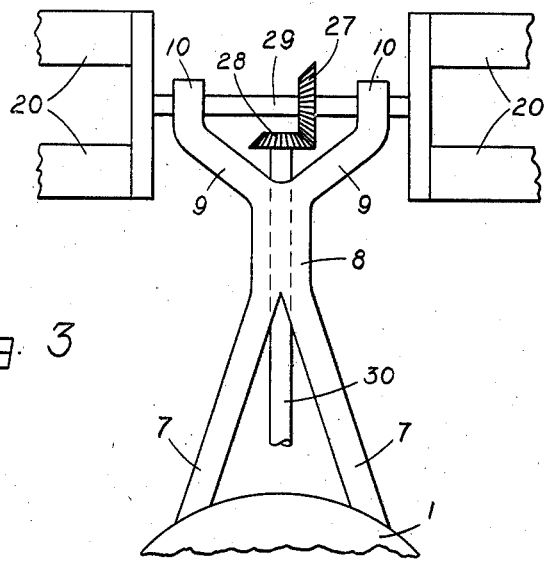
Fig. 3 is a fragmentary view in front elevation on an enlarged scale of the craft showing one arrangement that may be employed for supporting the inner ends of two cylindrical wing structures.

Although the cylindrical wing structure is autorotative under conditions of flight, it may nevertheless be desirable to rotate the cylindrical wing structures from the engine used in driving the propeller just prior to take off in order to reduce the length of run. For this purpose, as shown in Figs. 2 and 3 of the drawings, two bevel gears 27, 28 may be provided, the gear 27 being rigidly secured to the inner shaft 29 of the rotating wing structures and the gear 28 to a shaft 30 which is rotatably supported in the upright portion 8 of the supporting members 7. The shaft 30 terminates at its lower end in a bevel gear 31 which is in meshing engagement with a like gear 32 rigidly secured to a shaft 33. A clutch 34 provides a means for connecting the shaft 33 to rotate with the shaft of the engine 35 which drives the propeller 36.

In operation, the rotating wing structures 6 are rotated from the engine 35, if desired, just prior to take off to thereby reduce the run. Just prior to opening the throttle to its full position the clutch 34 is thrown out so that the cylindrical wing structures 6 are free to rotate under the air forces alone. Since, as pointed out hereinbefore, the cylinders 6 achieve sustentation in accordance with the Magnus effect the craft is capable of sustained flight. Should the engine 35 cease operation in flight, the cylindrical wing structures 6 continue to rotate by reason of the arrangement of the airfoils and develop lift under the action of the air forces.

According to the provisions of the patent statutes I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. In an aircraft, an auto-rotative wing structure comprising at least one lifting unit mounted for rotation about an axis longitudinally thereof, said unit including a plurality of airfoils positioned about said axis of rotation, the leading edge of each airfoil following the trailing edge of the next preceding airfoil in the direction of rotation of the unit and the outer surfaces of said airfoils conforming substantially to the surface of a cylinder the axis of which substantially coincides with the aforesaid axis of rotation.

2. In an aircraft, an autorotative wing structure comprising a plurality of non-oscillatory airfoils, portions of said airfoils lying substantially along a cylindrical surface, and the leading edge of each airfoil being juxtaposed to the trailing edge of the airfoil adjacent thereto so as to insure the autorotation of the airfoils attending the movement of the aircraft through a fluid medium such as air, the leading and trailing edges of said airfoils being substantially equidistant from the axis of rotation of the wing structure in all rotative positions of the latter.

3. In an aircraft, an autorotative cylindrical wing structure comprising a plurality of non-oscillatory airfoils, the leading and trailing edges respectively of any two airfoils being juxtaposed and substantially equidistant from the axis of rotation of the wing structure, the peripheral surfaces of said wing structure lying substantially along a cylindrical surface in all rotative positions of the latter.

4. In an aircraft, an autorotative wing structure, said wing structure having an outer contour conforming substantially to a cylindrical surface in all rotative positions of the same and comprised of a plurality of non-oscillatory airfoils, the leading edge of each airfoil being juxtaposed to the trailing edge of an adjacent airfoil.

5. In an aircraft, an auto-rotative wing structure comprising at least one lifting unit mounted for rotation about an axis longitudinally thereof, said unit including a plurality of airfoils positioned about said axis of rotation, the leading edge of each airfoil following the trailing edge of the next preceding airfoil in the direction of rotation of the unit and the outer surfaces of said airfoils conforming substantially to the surface of a cylinder the axis of which substantially coincides with the aforesaid axis of rotation, the said wing structure being provided with auxiliary propelling means.

DELMER S. FAHRNEY.